United States Patent
Wang et al.

(10) Patent No.: US 9,395,441 B1
(45) Date of Patent: Jul. 19, 2016

(54) POWERLINE-AIDED SATELLITE-BASED NAVIGATION SYSTEM

(75) Inventors: Yi-Hsiu Wang, Palo Alto, CA (US); Per K. Enge, Mountain View, CA (US)

(73) Assignee: QUALCOMM Incorporated, San Diego, CA (US)

( * ) Notice: Subject to any disclaimer, the term of this patent is extended or adjusted under 35 U.S.C. 154(b) by 704 days.

(21) Appl. No.: 12/764,420

(22) Filed: Apr. 21, 2010

(51) Int. Cl.
*G01S 19/03* (2010.01)
*H04B 3/54* (2006.01)
*G01S 19/07* (2010.01)

(52) U.S. Cl.
CPC . *G01S 19/03* (2013.01); *H04B 3/54* (2013.01); *H04B 3/546* (2013.01); *G01S 19/07* (2013.01)

(58) Field of Classification Search
CPC ......... G01S 19/07; G01S 19/41; G01S 19/40; H04B 3/54; H04B 3/542; H04B 3/546
USPC ..................................................... 342/357.42
See application file for complete search history.

(56) References Cited

U.S. PATENT DOCUMENTS

| | | | | |
|---|---|---|---|---|
| 5,812,086 A | * | 9/1998 | Bertiger et al. | 342/357.48 |
| 5,832,364 A | * | 11/1998 | Gustafson | 455/14 |
| 6,151,480 A | * | 11/2000 | Fischer et al. | 340/12.33 |
| 7,212,550 B2 | * | 5/2007 | Kauhanen | 370/503 |
| 8,193,977 B1 | * | 6/2012 | Ryan | 342/357.4 |
| 2004/0010368 A1 | * | 1/2004 | Scott | 701/213 |
| 2005/0164666 A1 | * | 7/2005 | Lang et al. | 455/282 |
| 2008/0079631 A1 | | 4/2008 | Lo et al. | |

OTHER PUBLICATIONS

M. K. Lee et al, "HomePlug 1.0 Powerline Communication LANs—Protocl Description and Performance Results version 5.4," International Journal of Comunication Systems, Sep. 18, 2002.*
Agrawal et al, "Algoritms for GPS Operation Indoors and Downtown," GPS Solutions (2002), 6:149-160.*
Morgan-Owen, Differential GPS Positioning, Electronics & Communication Engineering Journal. vol. 7, Issue 1 Feb. 1995, pp. 11-21.*
Ziaee, S. and Xavier Fernando, "Broadband over Power Lines: An Overview," Canadian Review, winter 2007, pp. 1-9.*
DTSI/ICCP/CISP(2008)3/Final Broadband Over Power Lines (BPL): Developments and Policy Issues, Jun. 2009, pp. 1-35.*

* cited by examiner

*Primary Examiner* — Gregory C Issing
(74) *Attorney, Agent, or Firm* — DeLizio Law, PLLC (57) ABSTRACT

GPS receivers obtain GPS navigation data from acquired GPS satellites and determine a position of the GPS receiver. However, the GPS receivers may not always be in view of the GPS satellites or may receive GPS signals that are too weak to decode. Moreover, assisted GPS techniques rely on the ability of the GPS receivers to connect to auxiliary channels to receive navigation data, which might not always be possible. Functionality for powerline-aided GPS can be implemented to provide the navigation data, with varying levels of accuracy via a powerline network, when the GPS satellites are not in view of the GPS receiver. Moreover, the GPS receiver can use the navigation data to determine the position of the GPS receiver and/or to synchronize a local clock in the GPS receiver. Receiving the navigation data can ensure that the GPS receiver has a fast time to first fix.

28 Claims, 5 Drawing Sheets

POWERLINE-AIDED SATELLITE-BASED NAVIGATION SYSTEM

BACKGROUND

Embodiments of the inventive subject matter generally relate to the field of satellite navigation systems, and more particularly, to powerline-aided, satellite-based navigation systems.

Electric transmission and distribution lines are typically used for providing electric power from generators to buildings, residences, and other components of a city's infrastructure. The electric power is transmitted over the transmission lines at a high voltage, and distributed to buildings and other structures at much lower voltages using electric power lines. Besides providing electric power, electric power lines can also be used to implement powerline communications within buildings and other structures. Powerline communications provides a means for networking electronic devices together and also connecting the electronic devices to the Internet.

SUMMARY

Various embodiments are disclosed for a powerline-aided, satellite-based navigation system. In some embodiments, navigation data is received, at a powerline network server of a powerline network, from at least a first of a plurality of navigation satellites. The navigation data enables one or more navigation devices coupled to the powerline network to determine position information associated with the one or more navigation devices. The navigation data is processed for transmission of the navigation data on the powerline network in conjunction with a powerline network signal associated with the powerline network. The navigation data is transmitted, on the powerline network, to the one or more navigation devices coupled to the powerline network.

BRIEF DESCRIPTION OF THE DRAWINGS

The present embodiments may be better understood, and numerous objects, features, and advantages made apparent to those skilled in the art by referencing the accompanying drawings.

DESCRIPTION OF EMBODIMENT(S)

The description that follows includes exemplary systems, methods, techniques, instruction sequences, and computer program products that embody techniques of the present inventive subject matter. However, it is understood that the described embodiments may be practiced without these specific details. For instance, although examples refer to powerline-aided satellite-based navigation techniques for global positioning system (GPS), in other embodiments, powerline-aided satellite-based navigation techniques can be implemented on other satellite navigation systems (e.g., GLONASS) or combinations of satellite navigation systems. In other instances, well-known instruction instances, protocols, structures, and techniques have not been shown in detail in order not to obfuscate the description.

GPS receivers typically search over frequency offset due to Doppler effect and local clock drifting. The GPS receivers slide PRN codes in time to acquire GPS satellites to receive GPS navigation messages and timing information from the GPS satellites and to, accordingly, determine a user's position, calculate directions to a destination, etc. However, the GPS satellites may not always be in line of sight to the GPS receiver. For example, buildings might impede the GPS receiver's ability to track the GPS satellites and determine the user's position. As another example, when indoors, the GPS receiver might receive GPS signals that are too weak to be decoded to retrieve the GPS navigation messages. Assisted GPS techniques typically provide the GPS navigation messages over auxiliary communication channels and rely on the ability of the GPS receiver to connect to these auxiliary channels to receive the GPS navigation messages. However, not all GPS receivers may have access to this separate communication link. For example, the Internet may provide this auxiliary channel, but it might be difficult for the GPS receiver to acquire Internet connectivity wirelessly in remote corners of a building.

Functionality can be implemented to use electric power lines to provide GPS navigation messages to help a GPS receiver when the GPS satellites are not in line of sight of the GPS receiver. Functionality can also be implemented on the GPS receiver to enable the GPS receiver to receive the GPS navigation messages when plugged into a powerline network socket. GPS navigation messages can be transmitted, with varying levels of accuracy, via the electric power lines to the GPS receiver. Geographic address information, GPS navigation messages, GPS signals, etc. can be distributed via the powerline network for powerline-aided GPS. Functionality can also be implemented to synchronize a local clock on the GPS receiver based on a powerline signal frequency. This can help ensure that GPS receivers can receive the GPS navigation messages through the powerline network, even if the GPS receivers are located in remote corners of the building, have no access to the Internet to download the GPS navigation messages, and are not in line of sights of the GPS satellites. Receiving the GPS navigation messages can help ensure that once the GPS receiver is disconnected from the powerline network, the GPS receiver does not need to receive the GPS navigation messages again. After connection between the GPS receiver and the powerline network is terminated, the GPS receiver can still acquire satellite signals and calculate position, velocity, and time (PVT) information in a very short time interval. In other words, even an intermittent source of the GPS navigation messages can help ensure that the GPS receiver has a fast time to first fix irrespective of whether or not it is connected to the powerline network. Moreover, because of the local nature of the powerline network, the location information and GPS navigation messages provided via the powerline network may be more accurate.

Figure 1:
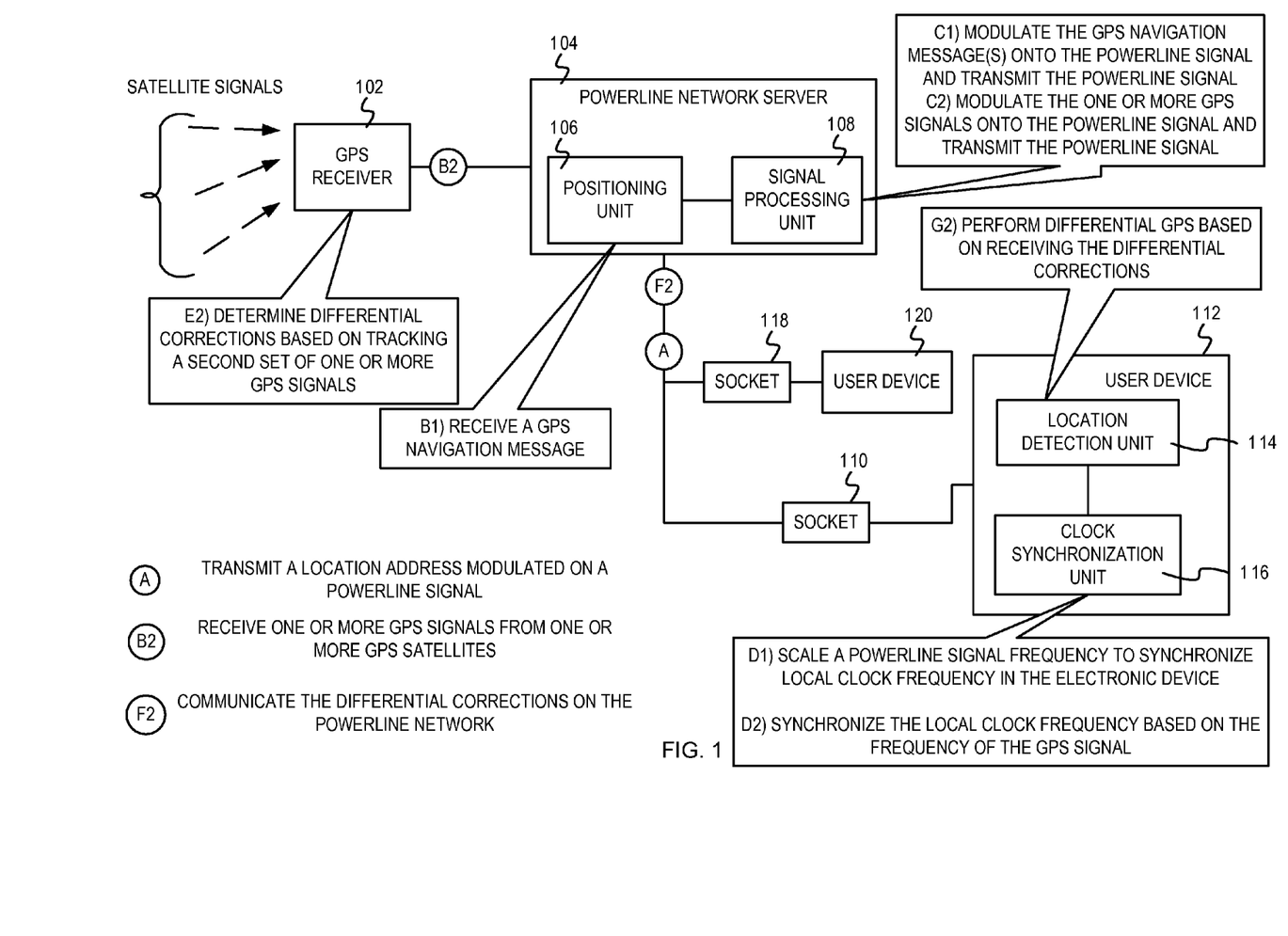
FIG. 1 is a conceptual diagram illustrating various mechanisms for powerline-aided satellite-based navigation.

FIG. 1 is a conceptual diagram illustrating various mechanisms for powerline-aided satellite-based navigation. FIG. 1 depicts a GPS receiver 102, a powerline network server 104, powerline network sockets 110 and 118, and user devices 112 and 120. The powerline network server 104 comprises a positioning unit 106 and a signal processing unit 108. The user device 112 comprises a clock synchronization unit 116 and a location detection unit 114. The user device 112 is coupled to (e.g., plugged into) the powerline network socket 110, while the user device 120 is coupled to the powerline network socket 118. In addition, the powerline network sockets 110 and 118 are coupled to the powerline network server 104.

The GPS receiver 102 is configured to receive GPS signals from a plurality of GPS satellites. The GPS receiver 102 may implement functionality to process the GPS signals, determine location information, and provide the location information to the powerline server 104. In some implementations, the GPS receiver 102 may provide GPS navigation messages and/or the GPS signals to the powerline network server 104, as will be described below with reference to FIGS. 1 and 2. The GPS receiver 102 may be housed along with the powerline network server 104 (e.g., within a building), or the GPS receiver 102 may be a remote GPS receiver that communicates with the powerline network server 104 via the Internet or another suitable communication network. The powerline network server 104 can be used to distribute electric power via a powerline network for use in typical applications (e.g., in a house, a building, shopping mall, etc.) The user devices 112 and 120 connect to the powerline network to receive location information and other satellite navigation data via the powerline network.

The powerline network server 104 provides location information and GPS navigation data in various stages, each with varying levels of accuracy, for powerline assisted GPS. At a lowest level, the powerline network server 104 may transmit geographic address information as will be described with reference to stage A1. To provide a higher level of accuracy, the powerline network server 104 may provide a GPS navigation message (as will be described with reference to stages B1 and C1) to enable position calculation, while frequency synchronization may be achieved based on the powerline signal frequency (as will be described with reference to stage D1). At a highest level of accuracy, the powerline network server 104 may provide GPS signals comprising the GPS navigation message and enable time and frequency synchronization by transmitting a GPS carrier coherent with the GPS signals (as will be described with reference to stages B2-D2). Lastly, depending of the user device's visibility of the GPS satellites, differential GPS may also be performed (as will be described with references to stages E2-G2). It should be noted that depending on the availability of GPS signals and the GPS navigation message, the powerline network server 104 may implement one or more of the aforementioned stages, while always trying to provide the most accurate and stable information for position calculation, timing synchronization, and frequency synchronization.

At stage A, the powerline network server 104 transmits a location address over the powerline network. The location address may be a geographic address comprising a street name, a building number, a city name, a zip code, and/or other location information. In one implementation, the powerline network server 104 may receive the location address from the GPS receiver 102. In another implementation, the powerline network server 104 may receive the location address from a remote server via the Internet or another suitable communication network. In another implementation, the powerline network server 104 may retrieve and transmit a pre-programmed location address onto the powerline signal. At stage A, to receive the location address, the user device 120 need not be a navigational device (e.g., a handheld GPS receiver). The user device 120 may be a mobile phone, a laptop, personal digital assistant (PDA) or any suitable user device that can receive and indicate the location address to a user.

It should be noted that if the user device 112 does not comprise a GPS receiver, then the user device 112 may only implement stage A1 (i.e., receive the location address). However, if the user device 112 comprises a GPS receiver, the user device 112 may implement stages B1-D1 and/or stages B2-G2. For example, the user device 112 may be a satellite navigation device (e.g., a GPS receiver), a laptop with a GPS receiver, a mobile phone with a GPS receiver, and other suitable electronic devices with satellite navigation capabilities (e.g., implemented in hardware and/or software). Additionally, in some implementations, the location address received at stage A may be used in conjunction with GPS navigation messages (stage B1) and other the GPS signals (stage B2) to determine the user's position. For example, the location address may be used as an initial value of the position of the user device 112 and the position of the user device 112 may be further refined based on information received at stages B1 and/or B2.

At stage B1, the positioning unit 106 receives a GPS navigation message. The GPS navigation message may be a digital representation of position and orbital information for one or more of the GPS satellites (e.g., ephemeris data). The GPS navigation message may be used to determine the position of the user device 112. In one implementation, the positioning unit 106 may receive the GPS navigation message from the GPS receiver 102 (e.g., housed at the same location as the powerline network server 104). In another implementation, the powerline network server 104 may receive the GPS navigation message from a GPS receiver at a remote location or a remote server via the Internet or another suitable communication network. In some implementations, the powerline network server 104 may receive the GPS navigation message via the Internet. In another implementation, the powerline network server 104 may receive the GPS navigation message via a wireless network (e.g. Wi-Fi signals), phone lines (e.g., PSTN network, cellular network), a television signal transmission network, etc.

At stage C1, the signal processing unit 108 modulates the GPS navigation message onto the powerline signal and transmits the powerline signal on a powerline communication network. The signal processing unit 108 may transmit the GPS navigation message as part of data on a pilot channel, to all users of the powerline network (e.g., the user devices 112 and 120 plugged into the powerline network sockets 110 and 118, respectively, that connect to the powerline network). The signal processing unit 108 may impress a modulated carrier signal (comprising the GPS navigation message) on the powerline network wiring. In another implementation, the GPS navigation message may not be modulated onto the powerline network signal and may instead be transmitted on a data channel that coexists with the powerline signal.

The user device 112 connected to the powerline network socket 110 can receive the GPS navigation message and store information about the satellite's position and orbital information. The user device 112 may be a GPS receiver or other suitable electronic device capable of determining the user's position based on information in the GPS navigation message. In one implementation, the location detection unit 114 may receive a modulated carrier signal (at a known carrier signal frequency or within a known band of carrier signal frequencies) comprising the GPS navigation message and demodulate the signal to retrieve the GPS navigation message. By receiving and storing the GPS navigation message, the user device 112 need not spend time receiving an ephemeris and almanac from the GPS satellites, once the user device 112 acquires the GPS satellites. The user device 112 can use the stored GPS navigation message to acquire appropriate satellites, receive the GPS signals, and calculate directions to a destination with greater speed.

At stage D1, the clock synchronization unit 116 of the user device 112 determines and scales a frequency of the powerline signal ("powerline signal frequency") to synchronize a frequency of a local clock in the user device 112 ("local clock frequency"). A local oscillator (e.g., a crystal controlled local oscillator) may maintain and control the local clock frequency. Proper synchronization between the local clock in the user device 112 and atomic clocks on the GPS satellite can minimize the frequency and time uncertainty to search for the GPS signals. This can ensure that the location detection unit 114 quickly calculates position thus enhancing sensitivity of GPS signal acquisition. At stage D1, the clock synchronization unit 116 may rely on the stability of the powerline signal frequency (e.g., 60 Hz) to synchronize the local clock frequency with a GPS operational frequency. The clock synchronization unit 116 can multiply the powerline signal frequency by a suitable multiplier to yield an approximate GPS operational frequency. In one implementation, the GPS operational frequency may be an average frequency of the GPS satellites in view after individual Doppler shifts associated with each of the GPS satellites in view have been removed. Once the Doppler shifts are removed, the resulting GPS operational frequency can be used to calibrate or remove frequency offset of the user device 112. Operations for synchronizing the local clock frequency and the GPS operational frequency based on the powerline signal frequency will further be described below with reference to FIG. 4. Alternatively, the clock synchronization unit 116 may rely on the stability of the GPS signals, if they are superposed on the powerline network as described in stage C1, to synchronize the local clock frequency.

In some embodiments, the powerline network can be used to transmit, to electronic navigation devices, additional information about/from the GPS satellites for enhanced navigation ability. For example, while the powerline network server 104 provides some information about the GPS satellites (e.g., the position and orbital information) at stage B1, the GPS navigation message (provided at stage B1) does not comprise GPS operational frequency and timing information. Therefore, the clock synchronization unit 116 cannot use the GPS navigation message to synchronize the local clock with the atomic clock of the GPS satellites. Stages B2-G2 describe how the powerline network can be used to provide GPS signal(s) to the electronic navigation devices to facilitate frequency and timing synchronization, position error correction using differential GPS, etc.

In some implementations, at stage B2, the GPS receiver 102 receives one or more GPS signals from one or more GPS satellites. The one or more GPS signals includes GPS satellite status information and a time when the one or more GPS signals were transmitted by the one or more GPS satellites. The one or more GPS signals also include GPS navigation messages comprising an ephemeris (indicating GPS satellite position and orbital information) and an almanac (indicating orbital information of all the GPS satellites). The one or more GPS signals also provides an indication of the GPS operational frequency and timing information which can be used by the clock synchronization unit 116 to synchronize the local clock of the user device 112 with the atomic clock of the GPS satellites The GPS receiver 102 provides the one or more GPS signals to the powerline network server 104.

At stage C2, the signal processing unit 108 modulates the one or more GPS signals onto the powerline signal for transmission on the powerline network. The one or more GPS signals can provide an indication of the GPS operational frequency and the timing information. In one implementation, the signal processing unit 108 can demodulate the one or more GPS signals, retrieve the GPS navigation message(s) and modulate the GPS navigation message(s) on a tone that is synchronized with the GPS operational frequency. In another implementation, the one or more GPS signals may be modulated onto a frequency band that coexists with the powerline signal and does not interfere with the powerline signal. In some implementations, the signal processing unit 108 can demodulate the one or more GPS signals, retrieve a GPS carrier signal, and transmit the carrier signal on the powerline network to aid with frequency and timing synchronization. The signal processing unit 108 may or may not transmit the GPS navigation message(s). Transmitting the one or more GPS signals, including the frequency and timing information, instead of the GPS navigation message sans the frequency and timing information (transmitted at stage C1), can help improve frequency and timing synchronization between the local clock (e.g., at the user device 112) and the atomic clock (e.g., at the GPS satellites).

At stage D2, the clock synchronization unit 116 synchronizes the local clock frequency in the user device 112 based on the one or more GPS signals. The clock synchronization unit 116 can, based on the one or more GPS signals, perform frequency and timing synchronization to ensure that the local clock on the user device 112 and the atomic clock on the GPS satellite are synchronized. The clock synchronization unit 116 can, based on information in the one or more GPS signals, also compensate for clock errors (e.g., timing drift), radio propagation effects (e.g., effects of the ionosphere), etc. This can minimize errors in calculating position, velocity, and time.

Based on operations described with reference to blocks B2-D2, the location detection unit 114 can determine coordinates of the user's position and, in some implementations, may also determine directions (e.g., for navigating around the user's current position, etc.), locate points of interest (e.g., restaurants within a mall), etc. For example, the location detection unit 114 may provide directions for navigation within a shopping mall, locating an exit of the shopping mall, navigating from a shop in the shopping mall to a restaurant in the shopping mall's food court, etc. However, in some implementations, the location detection unit 114 may be further able to refine the coordinates of the user's current position as described with reference to stages E2-G2.

In some implementations, at stage E2, the powerline network server 104 receives a second set of one or more GPS signals from one or more GPS satellites, which can be used to perform differential GPS (DGPS) operations to better calculate (or refine) the coordinates of the user's position. DGPS relies on the proximity of the user device 112 to the GPS receiver 102 and assumes that both the user device 112 and the GPS receiver 102 experience similar atmospheric errors. In one implementation, the GPS receiver 102 may track the second set of one or more GPS signals and process the second set of one or more GPS signals to determine code and carrier phase measurements. The code and carrier phase measurements constitute differential corrections that may be applied to refine the coordinates of the user's position. The GPS receiver 102 can provide the differential corrections to the powerline network server 104 and may direct the powerline network server 104 to broadcast the differential corrections to the user devices 120 and 112 over the powerline network.

At stage F2, the powerline network server 104 communicates the differential corrections, via the powerline network, to the user devices 112 and 120 connected to the powerline network. In one implementation, the signal processing unit 108 may receive the differential corrections (e.g., the code and carrier phase measurements) from the GPS receiver 102 and modulate the differential corrections on a tone that is synchronized with the GPS operational frequency. In another implementation, the signal processing unit 108 may transmit the differential corrections on a data channel of the powerline network.

At stage G2, the location detection unit 114 performs differential GPS based on receiving the differential corrections. A GPS receiver (not shown) in the user device 112 can acquire and track GPS signals and utilize the differential corrections (e.g., code and carrier phase measurements) to remove atmospheric errors such as ionosphere delay that affect both the user device 112 and the GPS receiver 102. The location detection unit 114 can use the differential corrections to minimize errors due to atomic clock drift, ephemeris data errors, etc. The location detection unit 114 can receive and apply the differential corrections to accurately calculate position, velocity, and time. After the location detection unit 114 refines the coordinates of the user's position, the location detection unit 114 may also determine directions to a destination, locate points of interest, etc. Applying the differential corrections can improve accuracy of the user's position (e.g., within 0.5 m).

As described above, satellite navigation data can be provided to user devices over the power line network with varying levels of accuracy to improve signal acquisition in environments where several or all of the GPS satellite signals are blocked or attenuated (e.g., by building walls and roofs). The location detection unit 114 in the user device 112 can use the satellite navigation data at one or more levels of accuracy depending on the configuration of the location detection unit 114 and/or the satellite navigation data available on the powerline network. For example, if the location detection unit 114 does not comprise a GPS receiver, the location detection unit 114 may only receive geographic location information (as described in stage A1). If the location detection unit 114 comprises the GPS receiver, the location detection unit 114 may receive other satellite navigation data. In one implementation, the location detection unit 114 may be configured to first try to detect the GPS signal superposed on the powerline signal. If the location detection unit 114 detects the GPS signal superposed on the powerline signal, the location detection unit 114 may try to detect on the powerline network differential correction information for performing differential GPS operations to refine the coordinates of the user's position. However, if the location detection unit 114 is unable to detect the GPS signal superposed on the powerline signal, the location detection unit 114 may try to detect the GPS navigation message and lastly detect the geographical address information. In another implementation, the location detection unit 114 may be configured to first receive the geographical address information, then try to detect the GPS navigation message on the powerline signal, and lastly try to detect the GPS signal superposed on the powerline signal. Likewise, for frequency and timing synchronization, the location detection unit 114 may first try to detect the GPS signals. In the absence of the GPS signals, the location detection unit 114 can try to detect multi-frequency signals on the powerline network that are crafted to convey GPS frequency and time information, and lastly (in the absence of the multi-frequency signals) the location detection unit 114 can perform synchronization based on frequency of the powerline network signal.

Figure 2:
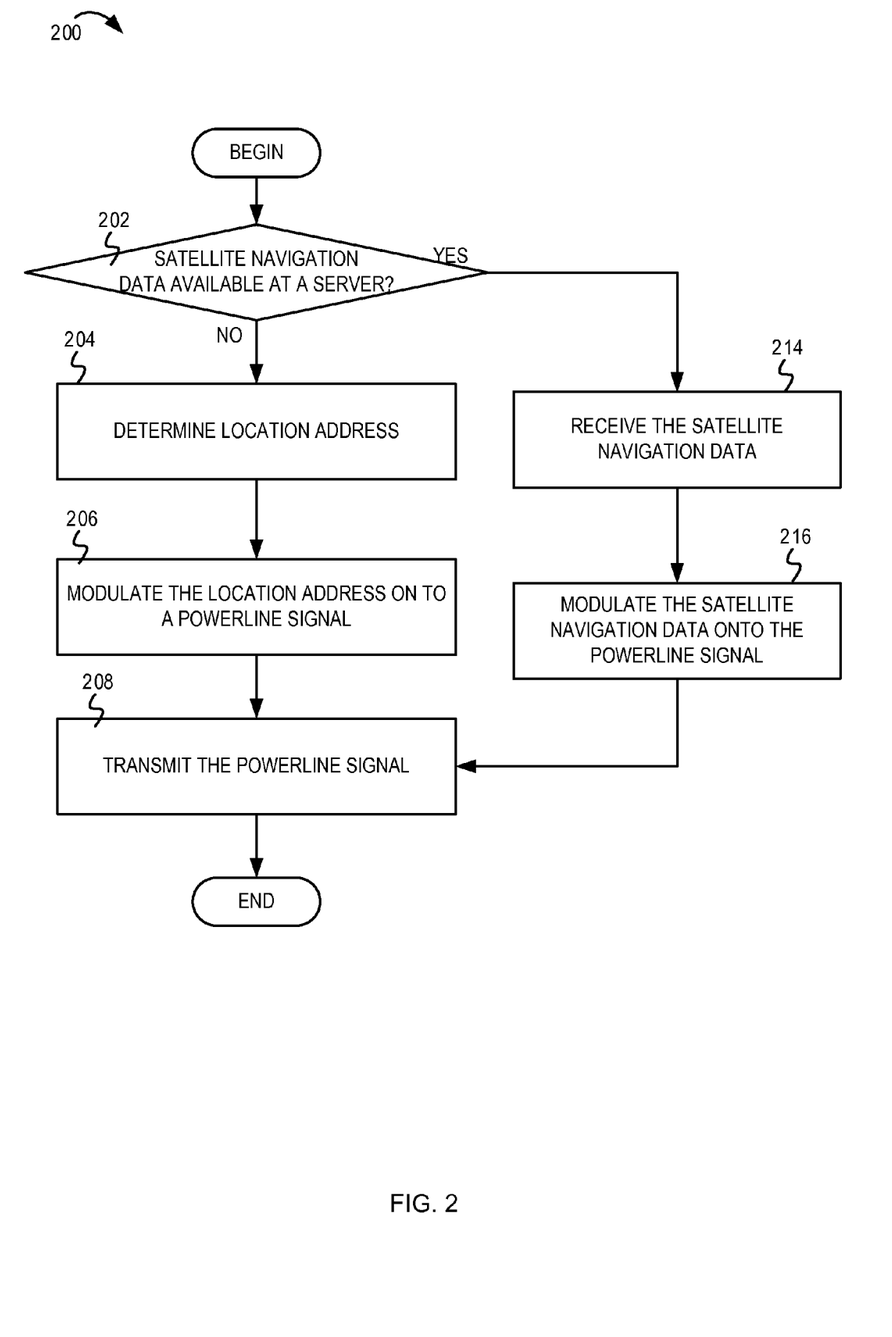
FIG. 2 is a flow diagram illustrating example operations for powerline-aided satellite-based navigation.

FIG. 2 is a flow diagram illustrating example operations for powerline-aided satellite-based navigation. Flow 200 begins at block 202

At block 202, a server determines whether satellite navigation data is available to the server. For example, the positioning unit 106 of the powerline network server 104 (shown in FIG. 1) may determine whether the satellite navigation data is available. The positioning unit 106 may receive a GPS signal received from a GPS receiver 102. The GPS signal may include the satellite navigation data comprising position and orbital information of each of the GPS satellites, information for correcting atomic clock drift in GPS signals received from each of the GPS satellites, etc. The GPS satellite signals also contain frequency and timing information. Alternatively, the positioning unit 106 may receive, from a remote server, a GPS navigation message as a digital representation of the position and orbital information of the GPS satellites. If the positioning unit 106 determines that the satellite navigation data is not available, the flow continues at block 204. Otherwise, the flow continues at block 214.

At block 204, a location address is determined. For example, the positioning unit 106 determines the location address. The location address may be a geographic address indicating a geographic location of the powerline network server 104 (e.g., inside a building, a shopping mall, or other area serviced by the powerline network server 104). The location address may be described in terms of a street name, a zip code, etc. In some implementations, the location address may be described in terms of coordinates (e.g., latitudes and longitudes, etc.). The positioning unit 106 may determine the location address based on receiving information from the GPS receiver 102, accessing a predefined memory location to retrieve a pre-programmed location address, etc. The flow continues at block 206.

At block 206, the location address is modulated on to a powerline signal. For example, the signal processing unit 108 may modulate the location address on to the powerline signal. The signal processing unit 108 may modulate the location address on to a high frequency carrier signal, such that a resultant modulated signal is sufficiently separated, in frequency, from the powerline signal and does not interfere with the powerline signal or harmonics of the powerline signal. Alternatively, the signal processing unit 108 may modulate the location address onto a signal with multiple carrier signals. The frequency of the multiple carrier signals are separated such that transmission through the powerline to the end users is guaranteed. The flow continues at block 208.

At block 214, the satellite navigation data is received. For example, the positioning unit 106 may determine the satellite navigation data. The flow 200 moves from block 202 to block 214 if the positioning unit 106 determines that the satellite navigation data is available. As described with reference to block 202, the satellite navigation data may be a combination of one or more GPS navigation messages that indicate satellite position and orbital information (e.g., ephemeris data) for assisted GPS. The positioning unit 106 may receive the satellite navigation data from a local base GPS receiver 102, from a remote base GPS receiver, from a remote server via the Internet, from a roving GPS receiver (e.g., the user device 120), etc. Alternately, the positioning unit 106 may determine the satellite navigation data based on receiving one or more GPS signals. In addition to providing position and orbital information of the GPS satellites, the GPS signal can also comprise timing and frequency information to aid frequency and timing synchronization of a local clock in the user device 112 with atomic clocks on the GPS satellites. In some implementations, the GPS receiver 102 may receive and provide one or more GPS satellite signals to the positioning unit 106. In some implementations, additional information for frequency and timing synchronization, correcting errors, etc. may also be provided (if available) as part of the satellite navigation data. The flow continues at block 216.

At block 216, the satellite navigation data is modulated onto the powerline signal. For example, the signal processing unit 108 may modulate the satellite navigation data onto the powerline signal. In one implementation, the signal processing unit 108 may modulate the satellite navigation data onto a tone that is synchronized with a GPS operational frequency. In one implementation, the GPS operational frequency may be an average frequency of the GPS satellites in view after individual Doppler shifts associated with each of the GPS satellites in view have been removed. In other implementation, the signal processing unit 108 may modulate the satellite navigation data onto a carrier signal of any suitable frequency. In some implementations, the signal processing unit 108 may select the frequency of the carrier signal such that the modulated signal coexists with the powerline signal and is not affected by either the powerline signal or harmonics of the powerline signal. In some implementations, a GPS carrier that is coherent with the GPS signal may be transmitted on the powerline network. The GPS carrier may be used for frequency synchronization. Other satellite navigation data (e.g., position and orbital information) may or may not be transmitted along with the GPS carrier. For example, the other satellite navigation data may be stripped from the GPS signal to yield the GPS carrier. Additionally, the GPS carrier may or may not be corrected for Doppler shift.

However, it may be difficult to determine how various resonances (e.g., powerline signal harmonics, powerline signal fluctuations, reflections at junction boxes, etc.) will affect a signal at a given frequency (e.g., which frequencies will be attenuated, etc.). Therefore, in some implementations, the signal processing unit 108 may modulate the satellite navigation data onto a signal with multiple carrier signals. The frequency of these multiple carrier signals may be separated such that transmission through the powerline to the end users is guaranteed. Moreover, any or all of these carriers may be synchronized to the one or more GPS signals received by the base GPS receiver 102. Alternatively, in some implementations, the one or more GPS signals may be modulated onto a wide frequency band that coexists with the powerline signal. In either case, the GPS signals and the powerline signal can be transmitted simultaneously. The frequency band may be determined so that a predetermined fraction of the signal power propagates through the entire powerline network serviced by the powerline network server 104 without experiencing attenuation or interference. For example, the GPS signal may be transmitted over a predefined number of frequencies, e.g., a set of ten frequencies. The user device 112 can scan the frequency band, detect the GPS signal on at least one of the set of ten frequencies, demodulate and receive the GPS signal, correct for frequency and timing errors, etc. The flow continues at block 208.

At block 208, the powerline signal is transmitted. For example, the powerline network server 104 transmits the powerline signal. The flow 200 moves from block 206 to block 208 after the signal processing unit 108 modulates the location address on to the powerline signal. The flow 200 also moves from block 216 to block 208 after the signal processing unit 108 modulates the satellite navigation data onto the powerline signal. Any suitable user device (not necessarily electronic devices with GPS navigation capabilities) connected to the powerline network may receive and display the location address. The user devices with GPS navigation capabilities may receive, if available, the satellite navigation data and perform some of the operations described above, e.g., determine a position of the user and synchronize a local clock. The user devices may locate and receive signals from GPS satellites and calculate directions to a destination once the GPS satellites are in line of sight of the user device. From block 208, the flow ends.

Figure 3:
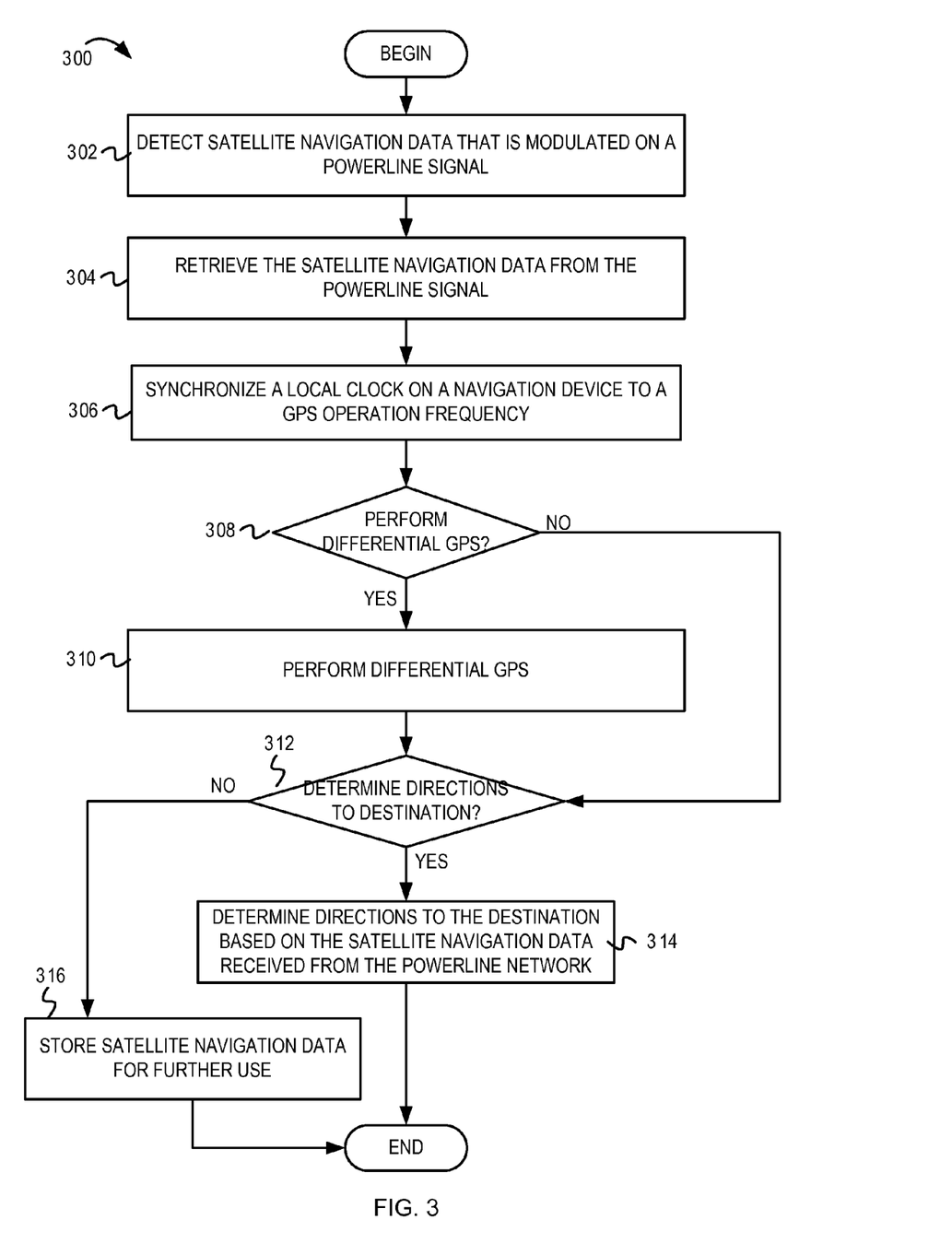
FIG. 3 is a flow diagram illustrating example operations for satellite navigation based on location information modulated on a powerline signal.

FIG. 3 is a flow diagram illustrating example operations for satellite navigation by a user device based on location information modulated on a powerline signal. Flow 300 begins at block 302.

At block 302, satellite navigation data that is modulated on a powerline signal is detected. For example, the location detection unit 114 of user device 112 (shown in FIG. 1) may detect the satellite navigation data that is modulated on the powerline signal. The satellite navigation data can comprise location information that indicates a geographic address of a powerline network server 104 or a powerline network socket 110 of a powerline network serviced by the powerline network server 104. The satellite navigation data can also comprise a digital representation of GPS navigation messages (e.g., satellite position and orbital information). The satellite navigation data may be modulated onto a carrier signal sufficient separated from the powerline signal frequency, so as to minimize interference. In one implementation, the GPS navigation messages may be modulated onto a carrier signal that is synchronized with a GPS operational frequency. In another implementation, the GPS navigation messages may be modulated onto multiple carriers or other wideband signal that may be synchronized with the GPS operational frequency. In some implementations, the satellite navigation data can also comprise a GPS signal (including timing and frequency synchronization information) modulated on to the powerline signal. It should be noted that each of the GPS satellites operate at a common frequency but may be received by the user device 112 with different frequency offsets because of Doppler effects from satellite motion and user motion. Therefore, in one implementation, the GPS operational frequency may be calculated as an average frequency of the GPS satellites in view after individual Doppler shifts associated with each of the GPS satellites in view have been removed. Once the Doppler shifts are removed, the resulting GPS operational frequency can be used to calibrate or remove frequency offset of the user device 112 as described below. The flow continues at block 304.

At block 304, the satellite navigation data is retrieved from the powerline signal. For example, the location detection unit 114 retrieves the satellite navigation data from the powerline signal. The location detection unit 114 may receive a modulated carrier signal comprising the satellite navigation data and demodulate the signal to retrieve the satellite navigation data. In one implementation, the location detection unit 114 may receive signals that are not at the powerline signal frequency (e.g., 60 Hz) or harmonics of the powerline signal frequency, and demodulate these signals to retrieve the satellite navigation data. In another implementation, the location detection unit 114 may be programmed to demodulate signals at specified frequencies or within a specified band of frequencies to retrieve the satellite navigation data. The flow continues at block 306.

At block 306, a local clock on a navigation device is synchronized to the GPS operational frequency. For example, a clock synchronization unit 116 may synchronize the local clock on the user device 120 to the GPS operational frequency. Performing synchronization to calibrate or remove frequency offset of the user device 112 can minimize a frequency range over which the user device 112 searches to acquire GPS satellites and consequently, reduces time-to-first-fix and improves sensitivity of a roving GPS receiver in the user device 112. In one implementation, the clock synchronization unit 116 may determine the GPS operational frequency and may perform frequency synchronization based on receiving a GPS carrier of a GPS signal. The GPS receiver 102 may receive the strongest GPS signal and provide the GPS signal to the powerline network server 104. The powerline network server 104 may remove or estimate the Doppler frequency due to the satellite motion. The powerline network server 104 may (or may not) strip the GPS navigation messages from the GPS signal to yield the GPS carrier. The powerline network server 104 may transmit, over the powerline network, the GPS carrier or a signal that is coherent with the GPS carrier.

However, if the clock synchronization unit 116 does not receive the GPS carrier, the clock synchronization unit 116 can use the powerline signal frequency to synchronize the local clock. The powerline network provides a stable frequency reference (e.g., 60 Hz) that can enable the clock synchronization unit 116 to calibrate the frequency of its clock crystal with high accuracy. The clock synchronization unit 116 may multiply the powerline signal frequency to yield the GPS operational frequency, as will be described below with reference to FIG. 4. For example, if the GPS operational frequency is 1575.42 MHz, the clock synchronization unit 116 may multiply the powerline signal frequency (e.g., 60 Hz) by $26.257 \times 10^6$, to yield the GPS operational frequency and synchronize the local clock with the calculated GPS operational frequency. On receiving GPS signals from one or more GPS satellites (e.g., when the location detection unit 114 is in line of the sight of the GPS satellites), the clock synchronization unit 116 can compare the local clock frequency against frequency information in the GPS signal and accordingly correct the local clock frequency. The flow continues at block 308.

At block 308, it is determined whether differential GPS should be performed. For example, the location detection unit 114 may determine whether differential GPS should be performed based on availability of multiple GPS signals and/or differential GPS corrections. The location detection unit 114 may perform differential GPS (or other operations for fine location tuning) to combat ionosphere delay, other radio propagation errors and atmospheric effects, atomic clock drift, errors in the satellite navigation data, etc. In one implementation, if the location detection unit 114 cannot receive the multiple GPS signals, the location detection unit 114 may determine that differential GPS cannot be performed. In another implementation, if the location detection unit 114 does not receive (e.g., on the powerline network or another suitable communication network) differential GPS corrections for correcting the aforementioned errors, the location detection unit 114 may determine that differential GPS cannot be performed. If the location detection unit 114 determines that differential GPS should be performed, the flow continues at block 310. Otherwise, the flow continues at block 312.

At block 310, differential GPS is performed. For example, the location detection unit 114 in the user device 112 performs differential GPS. The location detection unit 114 can receive the differential GPS corrections (e.g., code and carrier phase measurements) from the base GPS receiver 102, via the powerline network. A roving GPS receiver in location detection unit 114 can acquire and track GPS signals and apply the differential GPS corrections to subsequent calculations to accurately calculate position, velocity, and time. The flow continues at block 312.

At block 312, it is determined whether directions to a destination can be determined. For example, the location detection unit 114 may determine whether directions to the destination can be determined based on availability of satellite navigation data, line of sight visibility of one or more GPS satellites, etc. For example, the location detection unit 114 may determine that directions to the destination cannot be determined if the location detection unit 114 determines that the GPS satellites cannot be located, acquired, or tracked because of poor visibility of the GPS satellites. As described above, the powerline network server 104 may provide location information and GPS navigation data in various stages, each with varying levels of accuracy. The powerline network server 104 may transmit geographic address information as a lowest level, a GPS navigation message to enable position calculation at an intermediate level, and/or one or more GPS signals comprising the GPS navigation messages and time and frequency synchronization information at a highest level. Therefore, based on the accuracy of information available, the location detection unit 114 may or may not be able to determine the directions to the destination. In some implementations, the location detection unit 114 may receive the geographic address information along with the GPS navigation message and/or the one or more GPS signals. The location detection unit 114 may use the geographic address information as an initial value of a position of the user device 112. The position of the user device 112 may be further refined based on the GPS navigation message and/or the one or more GPS signals. The location detection unit 114 may determine its ability to determine the directions to the destination based on the satellite navigation data received over the powerline network. For example, the location detection unit 114 may determine that the directions to the destination can be determined if the location detection unit 114 receives multiple GPS signals via the powerline network. If the location detection unit 114 determines that the directions to the destination can be determined, the flow continues at block 314. Otherwise, the flow continues at block 316.

At block 314, the directions to the destination are determined based on the satellite navigation data from the power line. For example, the location detection unit 114 determines its location based on the satellite navigation data from the powerline network. Based on this location, the location detection unit 114 may determine directions for navigation within a building or other indoor space (e.g., a shopping mall). Typically, the location detection unit 114 may not be able to determine directions to the destination if the location detection unit 114 is not in line of sight of the GPS satellites and cannot receive the GPS signals. However, if the location detection unit 114 receives multiple GPS signals via the powerline network, the location detection unit 114 can determine the user's current position, perform timing and frequency synchronization to synchronize a local clock of the user device 112 with the atomic clocks of the GPS satellites, and accordingly determine the directions to the destination. For example, the location detection may determine directions to navigate through a shopping mall, locate specific shops or restaurants within the mall, etc. From block 314, the flow ends.

At block 316, the satellite navigation data is stored for further use. The flow 300 moves from block 312 to block 316 if the location detection unit 114 determines that the directions to the destination cannot be determined. For example, the location detection unit 114 may temporarily store the satellite navigation data from the power line if the location detection unit 114 receives, from the powerline network, only digital representations of the GPS satellites' position and orbital information. The location detection unit 114 may use the satellite navigation data to acquire the GPS satellites at a faster speed once at least one of the GPS satellites are in line of sight of the location detection unit 114. Once the location detection unit 114 acquires the GPS satellites, the location detection unit 114 may receive the GPS signals and solve a set of equations to accurately determine position, velocity, and time. From block 316, the flow ends.

Figure 4:
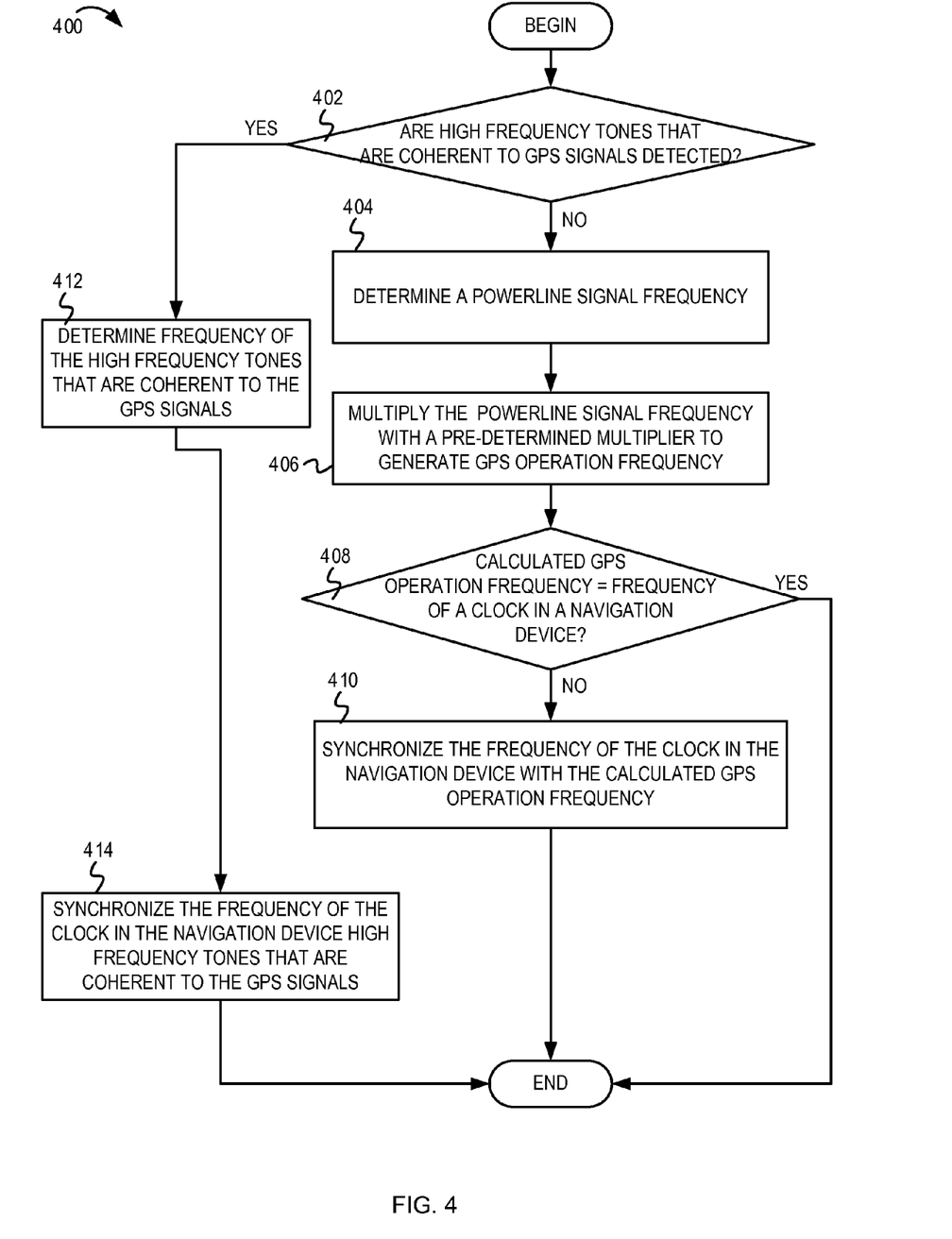
FIG. 4 is a block diagram illustrating example operations for synchronizing a clock in a navigation device based on a powerline signal frequency.

FIG. 4 is a block diagram illustrating example operations for synchronizing a clock in a navigation device based on a powerline signal frequency. Flow 400 begins at block 402.

At block 402, a user device determines whether high frequency tone(s) that are coherent to GPS signals are detected. For example, a clock synchronization unit 116 in the user device 112 of FIG. 1 may determine whether the high frequency tone(s) that are coherent to GPS signals can be detected. The clock synchronization unit 116 may try to detect single or multi-frequency signals on a powerline network that are configured to provide convey GPS frequency and timing information. The high frequency tone(s) may be selected such that they are sufficiently separated from and do not interfere with a powerline signal or harmonics of the powerline signal. If it is determined that the high frequency tone(s) that are coherent to GPS signals are detected, the flow continues at block 412. Otherwise, the flow continues at block 404.

At block 412, frequency of the high frequency tone(s) that is coherent to the GPS signals is determined. For example, the clock synchronization unit 116 may identify and determine the frequency of the high frequency tone(s). In one implementation, the high frequency tone(s) may be a carrier of the GPS signal at a GPS operational frequency. In another implementation, the high frequency tone(s) may be an intermediate frequency that is lower than the GPS operational frequency but is coherent with the carrier of the GPS signal. The clock synchronization unit 116 may identify the high frequency tone(s) by searching for high frequency tones that are not at the powerline signal frequency or at harmonics of the powerline signal frequency. In another implementation, the clock synchronization unit 116 may identify the high frequency tone(s) based on knowledge of a range of frequencies within which the high frequency tone(s) may lie. The flow continues at block 414.

At block 414, the frequency of the clock in the navigation device is synchronized with the frequency of the high frequency tone(s) that are coherent to the GPS signals. For example, the clock synchronization unit 116 can use high frequency tone(s) that are coherent with the GPS signal to aid with frequency and timing synchronization. If the high frequency tone is at the GPS operational frequency, the clock synchronization unit 116 can replace a local oscillator within a location detection unit 114 with the high frequency tone. If the high frequency tone is an intermediate frequency, the clock synchronization unit 116 can multiply the high frequency tone with a suitable multiplier and generate a signal to replace the local oscillator. From block 414, the flow ends.

At block 404, a powerline signal frequency is determined. The flow 400 moves from block 402 to block 404 on determining that the high frequency tone(s) that are coherent to the GPS signals cannot be detected. For example, the clock synchronization unit 116 may determine the powerline signal frequency. The user device 112 may be connected to a powerline network serviced by a powerline network server 104 via a powerline network socket 110. In one implementation, the powerline signal frequency may be 60 Hz. It should be noted that in other implementations, powerline signal frequency may be other suitable values (e.g., 50 Hz). The flow continues at block 406.

At block 406, the powerline signal frequency is multiplied with a pre-determined multiplier to generate a GPS operational frequency ("calculated GPS operational frequency"). For example, the clock synchronization unit 116 may multiply the powerline signal frequency by the pre-determined multiplier to generate a signal to replace the local oscillator within the location detection unit 114. In one implementation, the GPS operational frequency may be 1575.42 MHz, the powerline signal frequency may be 60 Hz, and the corresponding pre-determined multiplier may be $26.257 \times 10^6$. However, in some implementations, one or more higher frequency signals (e.g., at predefined frequencies) may be superposed on the powerline. A comparatively smaller pre-determined multiplier may be used to multiply the frequency of the one or more higher frequency signals to yield the GPS operational frequency and to replace the local oscillator. In some implementations, the clock synchronization unit 116 may determine whether a current value of the powerline signal frequency is exactly at 60 Hz (or other suitable powerline frequency) before initiating frequency synchronization. The clock synchronization unit 116 may not initiate frequency synchronization if a difference between the current value of the powerline signal frequency and 60 Hz is greater than a threshold. The flow continues at block 408.

At block 408, it is determined whether the calculated GPS operational frequency is equal to a frequency of a clock in the navigation device. For example, the clock synchronization unit 116 may determine whether the calculated GPS operational frequency is equal to the frequency of the clock in the user device 112. If the clock synchronization unit 116 determines that the calculated GPS operational frequency is equal to the frequency of the clock in the navigation device, the flow ends. Otherwise, the flow continues at block 410.

At block 410, the frequency of the clock in the navigation device is synchronized with the calculated GPS operational frequency. For example, the clock synchronization unit 116 may synchronize the frequency of the clock in the navigation device with the calculated GPS operational frequency, to compensate for timing and drift errors in the clock frequency of the navigation device. From block 410, the flow ends.

It should be understood that the depicted flow diagrams (FIGS. 2-4) are examples meant to aid in understanding embodiments and should not be used to limit embodiments or limit scope of the claims. Embodiments may perform additional operations, fewer operations, operations in a different order, operations in parallel, and some operations differently. For instance, although FIG. 2 describes the powerline network server 104 modulating the location address on to the powerline signal (block 206), in some implementations, the powerline network server 104 may not modulate the location address onto the powerline signal. Instead, powerline network sockets (e.g., outlets of the powerline network) may be fitted with adapters that may be programmed with the location address. In one implementation, each of the adapters may be programmed with a common location address (e.g., the location address of the powerline network server 104). For example, a powerline network server 104 may service ten apartments in a building or multiple houses in a neighborhood. Adapters in each of the houses or apartments may be programmed to provide the location address of the powerline network server 104. In another implementation, each of the adapters may be programmed with a different location address. Referring to the previous example, of the powerline network server 104 servicing ten houses in a neighborhood, adapters in each of the houses may be programmed to provide a unique house address so that accurate location information can provided to the user device. In other words, the adapter in a first house may provide a house number of the first house, the adapter in a second house may provide a house number of the second house, etc. When a user device is plugged into a powerline network socket, the user device may receive the location address programmed into the adapter associated with the powerline network socket.

It should also be noted that, although FIG. 2 depicts the location address being transmitted only in the absence of satellite navigation data, in some implementations, the location address might be transmitted irrespective of the availability of the satellite navigation data. Transmitting the location address along with the satellite navigation data can enable all user devices connected to the powerline network to be cognizant of their location. For example, the user devices with GPS navigation capabilities may extract the satellite navigation data from the powerline signal and accordingly determine location. The user devices without GPS navigation capabilities may extract the location address from the powerline signal and accordingly determine location.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a non-transitory machine-readable storage medium, or a transitory machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions. A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 5:
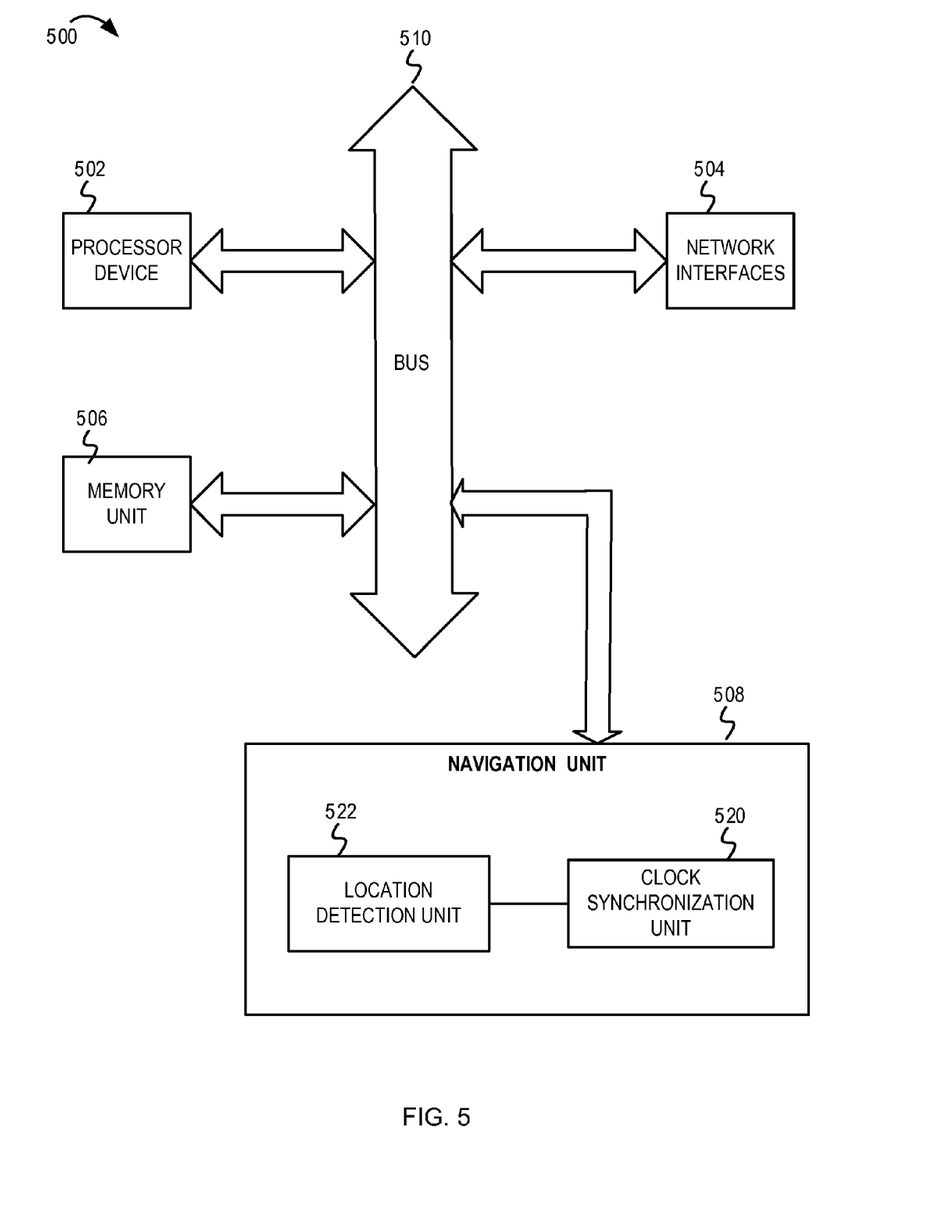
FIG. 5 is a block diagram of one embodiment of a user device including a mechanism for powerline-aided satellite-based navigation techniques.

FIG. 5 is a block diagram of one embodiment of a user device 500 including a mechanism for powerline-aided satellite-based navigation techniques. In some implementations, the user device 500 may be one of a personal computer (PC), a laptop, a netbook, a mobile phone, a personal digital assistant (PDA), a GPS receiver, or other electronic systems comprising a satellite navigation receiver. The user device 500 includes a processor device 502 (possibly including multiple processors, multiple cores, multiple nodes, and/or implementing multi-threading, etc.). The computer system 500 includes a memory unit 506. The memory unit 506 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The user device 500 also includes a bus 510 (e.g., PCI, ISA, PCI-Express, HyperTransport®, InfiniBand®, NuBus, etc.), and network interfaces 504 that include at least one wireless network interface (e.g., a WLAN interface, a Bluetooth® interface, a WiMAX interface, a ZigBee® interface, a Wireless USB interface, etc.).

The user device 500 also includes a navigation unit 508. The navigation unit 508 comprises a clock synchronization unit 520 and a location detection unit 522. The navigation unit 508 implements functionality for determining a position of a user and for performing powerline-aided satellite-based navigation as described with reference to FIGS. 1, 3, and 4.

It should be noted that any one of the above-described functionalities might be partially (or entirely) implemented in hardware and/or on the processing unit 502. For example, the functionality may be implemented with an application specific integrated circuit, in logic implemented in the processing unit 502, in a co-processor on a peripheral device or card, etc. Further, realizations may include fewer or additional components not illustrated in FIG. 5 (e.g., additional network interfaces, peripheral devices, etc.). The processor unit 502 and the network interfaces 504 are coupled to the bus 510. Although illustrated as being coupled to the bus 510, the memory 506 may be coupled to the processor unit 502.

While the embodiments are described with reference to various implementations and exploitations, it will be understood that these embodiments are illustrative and that the scope of the inventive subject matter is not limited to them. In general, techniques for powerline-aided satellite-based navigation systems as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method performed by a powerline network server, the method comprising:
   receiving, from at least a first navigation satellite of a plurality of navigation satellites, a satellite navigation signal at the powerline network server of a powerline network, wherein the satellite navigation signal includes navigation data for a navigation device to determine position information associated with the navigation device;
   selecting a carrier frequency that is coherent with the satellite navigation signal and that does not interfere with a powerline signal frequency associated with a powerline signal;
   processing the satellite navigation signal, at the powerline network server, for transmission via a navigation carrier signal at the carrier frequency; and
   transmitting the navigation carrier signal and the powerline signal to the navigation device via the powerline network, wherein the powerline signal provides power to the navigation device, and wherein the powerline signal frequency provides a stable frequency reference that enables the navigation device to calculate an operational frequency of the plurality of navigation satellites using a pre-determined multiplier.

2. The method of claim 1, wherein the navigation data comprises a digital representation of position information and a digital representation of orbital information.

3. The method of claim 1, wherein processing the satellite navigation signal comprises:
   processing the navigation data; and
   modulating the navigation data onto the carrier frequency to generate the navigation carrier signal.

4. The method of claim 1, further comprising:
   determining, at the powerline network server, corrections based, at least in part, on additional navigation data received from additional navigation satellites and the navigation data received from the first navigation satellite; and
   communicating the corrections to the navigation device via the powerline network.

5. The method of claim 1, further comprising:
   determining a geographic location address of the powerline network server; and
   communicating the geographic location address to the navigation device via the powerline network.

6. The method of claim 1, wherein processing the satellite navigation signal comprises:
   demodulating the satellite navigation signal to obtain the navigation data; and
   modulating the navigation data onto the carrier frequency.

7. The method of claim 1, wherein the plurality of navigation satellites are global positioning system (GPS) satellites.

8. The method of claim 5, wherein the geographic location address includes at least a street name and a zip code.

9. The method of claim 5, wherein the geographic location address includes geographic coordinates.

10. The method of claim 5, wherein the geographic location address of the powerline network server is utilized as an initial position of the navigation device until the position information of the navigation device is determined.

11. The method of claim 1, further comprising:
    determining a geographic location address of the powerline network server
    determining, at the powerline network server, corrections based, at least in part, on additional navigation data received from additional navigation satellites and the navigation data received from the first navigation satellite, and
    transmitting the geographic location address, the navigation data, and the corrections via the powerline network to the navigation device.

12. The method of claim 11, wherein the geographic location address, the navigation data and the corrections represent multiple levels of accuracy including at least a first level of accuracy associated with location information and a second level of accuracy associated with ephemeris data from the navigation data.

13. The method of claim 1, further comprising:
    selecting a plurality of carrier frequencies, wherein each of the plurality of carrier frequencies are separated within a frequency band; and
    transmitting the navigation carrier signal at each of the plurality of carrier frequencies.

14. A method performed by a navigation device, the method comprising:
    obtaining, at a navigation device, power from a powerline signal via a powerline network, the powerline signal having a powerline signal frequency;
    receiving, via the powerline network, a navigation carrier signal comprising satellite-based navigation data associated with a first plurality of navigation satellites, the navigation carrier signal having a carrier frequency that is coherent with a satellite navigation signal associated with a plurality of navigation satellites;
    multiplying either the powerline signal frequency or the carrier frequency by a pre-determined multiplier to yield a calculated operational frequency of the plurality of navigation satellites;
    synchronizing a frequency of a local clock of the navigation device based, at least on part, on the calculated operational frequency;
    demodulating the navigation carrier signal;
    retrieving the satellite-based navigation data from the demodulated navigation carrier signal; and
    determining a position of the navigation device based, at least in part, on the satellite-based navigation data.

15. The method of claim 14, further comprising:
    determining whether the navigation carrier signal is detected;
    in response to the navigation carrier signal not being detected, multiplying the powerline signal frequency by a first pre-determined multiplier to yield the calculated operational frequency; and
    in response to the navigation carrier signal being detected, multiplying the carrier frequency by a second pre-determined multiplier to yield the calculated operational frequency.

16. The method of claim 14, further comprising:
    determining that the navigation carrier signal is coherent with the satellite navigation signal and that the carrier frequency is at an expected operational frequency associated with the first plurality of navigation satellites; and
    synchronizing the local clock based, at least in part, on the carrier frequency.

17. The method of claim 14, further comprising:
    receiving, at the navigation device, navigation signals associated with the first plurality of navigation satellites via the powerline network;
    determining, from the satellite-based navigation data, frequency information and timing information associated with the satellite navigation signal, wherein the satellite-based navigation data comprises position information and orbital information; and determining the position of the navigation device based, at least in part, on the frequency information, the timing information, and the satellite-based navigation data.

18. The method of claim 17, further comprising:

receiving a geographic location address of a powerline network server via the powerline network; and determining the position information of the navigation device using the geographic location address of the powerline network server as an initial position of the navigation device.

19. The method of claim 14, wherein the navigation device comprises a laptop including a satellite-based navigation receiver, a mobile phone including a satellite-based navigation receiver, a netbook including a satellite-based navigation receiver, or a dedicated satellite-based navigation receiver.

20. The method of claim 14, wherein the satellite-based navigation data is associated with satellites in a global positioning system (GPS) satellite-based navigation system.

21. A powerline communication system comprising:

a positioning unit configured to:
  receive, from at least a first navigation satellite of a plurality of navigation satellites, a satellite navigation signal at a powerline network server of a powerline network, wherein the satellite navigation signal includes navigation data for a navigation device to determine position information associated with the navigation device; and a signal processing unit configured to:
  select a carrier frequency that is coherent with the satellite navigation signal and that does not interfere with a powerline signal frequency associated with a powerline signal;
  process the satellite navigation signal for transmission via a navigation carrier signal at the carrier frequency; and
  transmit the navigation carrier signal and the powerline signal to the navigation device via the powerline network, wherein the powerline signal provides power to the navigation device and the powerline signal frequency provides a stable frequency reference to the navigation device for clock synchronization.

22. The powerline communication system of claim 21, further comprising a satellite-based navigation receiver in communication with the positioning unit, wherein the satellite-based navigation receiver is configured to receive the satellite navigation signal from the first navigation satellite, and provide the satellite navigation signal to the positioning unit.

23. The powerline communication system of claim 21, wherein the navigation data comprises a digital representation of position information and a digital representation of orbital information.

24. The powerline communication system of claim 21, wherein the signal processing unit is further configured to process the navigation data and modulate the navigation data on the carrier frequency to generate the navigation carrier signal.

25. The powerline communication system of claim 21, wherein the signal processing unit is further configured to:

determine, at the powerline network server, corrections based, at least in part, on additional navigation data received from additional navigation satellites and on the navigation data received from the first navigation satellite, and communicate the corrections to the navigation device via the powerline network.

26. A navigation device comprising:

a connection configured to obtain power from a powerline signal via a powerline network, the powerline signal having a powerline signal frequency;

a location detection unit configured to:
  receive, via the powerline network, a navigation carrier signal comprising satellite-based navigation data associated with a first plurality of navigation satellites, the navigation carrier signal having a carrier frequency that is coherent with a satellite navigation signal associated with a plurality of navigation satellites;

a clock synchronization unit configured to:
  multiply either the powerline signal frequency or the carrier frequency by a pre-determined multiplier to yield a calculated operational frequency of the plurality of navigation satellites; and
  synchronize a frequency of a local clock of the navigation device based, at least on part, on the calculated operational frequency; and the location detection unit configured to:
  demodulate the navigation carrier signal;
  retrieve the satellite-based navigation data from the demodulated navigation carrier signal; and
  determine a position of the navigation device based, at least in part, on the satellite-based navigation data.

27. The navigation device of claim 26, wherein the clock synchronization unit is further configured to:

determine whether the navigation carrier signal is detected;

in response to the navigation carrier signal not being detected, multiply the powerline signal frequency by a first pre-determined multiplier to yield the calculated operational frequency; and in response to the navigation carrier signal being detected, multiply the carrier frequency by a second pre-determined multiplier to yield the calculated operational frequency.

28. The navigation device of claim 26, wherein the clock synchronization unit is further configured to:

determine that the navigation carrier signal is coherent with the satellite navigation signal and that the carrier frequency is at an expected operational frequency associated with the first plurality of navigation satellites; and synchronize the local clock based, at least in part, on the carrier frequency.

* * * * *